United States Patent
Basher et al.

(10) Patent No.: US 10,565,339 B2
(45) Date of Patent: Feb. 18, 2020

(54) TIMING-ADAPTIVE, CONFIGURABLE LOGIC ARCHITECTURE

(71) Applicant: Mellanox Technologies, Ltd., Yokneam (IL)

(72) Inventors: Uria Basher, Ganei Tal (IL); Anton Rozen, Gedera (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/038,207

(22) Filed: Jul. 18, 2018

(65) Prior Publication Data

US 2020/0026814 A1    Jan. 23, 2020

(51) Int. Cl.
*G06F 17/50* (2006.01)

(52) U.S. Cl.
CPC ...... *G06F 17/5059* (2013.01); *G06F 2217/84* (2013.01)

(58) Field of Classification Search
USPC ........................................................ 716/108
See application file for complete search history.

(56) References Cited

U.S. PATENT DOCUMENTS 6,651,224 B1 * 11/2003 Sano ..................... G06F 17/505
716/114

OTHER PUBLICATIONS

Synopsys Inc, "Design Compiler® User Guide", Version D-2010.03-SP2, 465 Pages, Jun. 2010.
Ramamoorthy et al., "Pipeline Architecture", ACM Computing Surveys (CSUR) Surveys, vol. 9, issue 1, pp. 61-102 , Mar. 1977.

* cited by examiner

*Primary Examiner* — Bryce M Aisaka
(74) *Attorney, Agent, or Firm* — Kligler & Associates Patent Attorneys Ltd

(57) ABSTRACT

A method for designing a logic circuit includes providing an initial design of the logic circuit, including at least first and second logic stages, and a sequential component, which is inserted between the first and second logic stages and comprises a flip-flop or a latch. Timing delays of multiple paths in the initial design, including at least one path in which the sequential component is bypassed, are estimated. Based on the timing delays, a decision is made whether the paths in which the sequential component is bypassed meet a timing constraint set for the logic circuit. A final design of the logic circuit is then generated, in which the sequential component is either bypassed or not bypassed, depending on the decision.

10 Claims, 4 Drawing Sheets

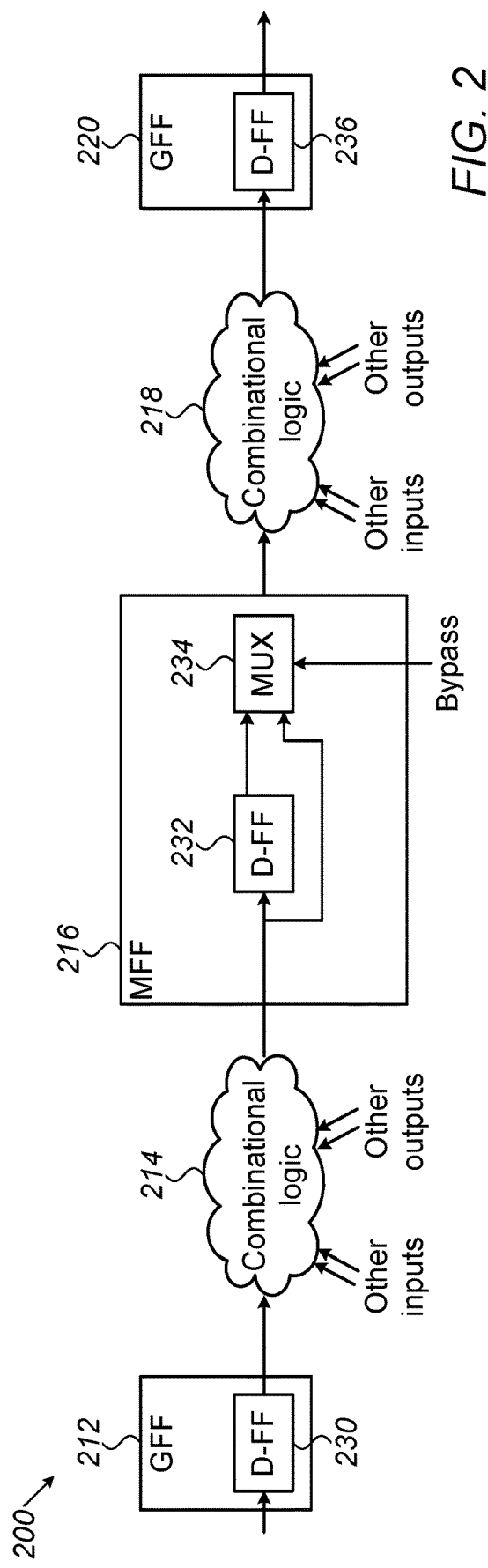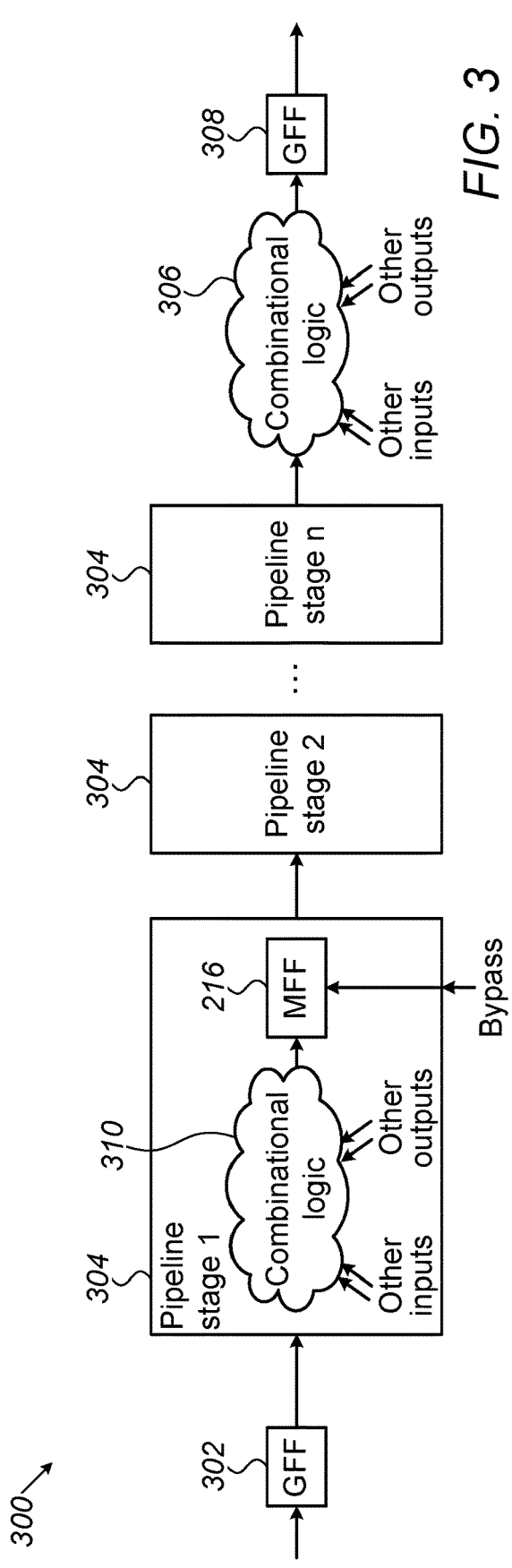

TIMING-ADAPTIVE, CONFIGURABLE LOGIC ARCHITECTURE

FIELD OF THE INVENTION

The present invention relates generally to VLSI design techniques, and particularly to Methods for Designing a timing adaptive configurable logic circuit.

BACKGROUND OF THE INVENTION

Digital design comprises the modeling of a circuit using binary elements, and the conversion of the model to physical elements. Techniques for efficient digital design are described, for example, by Synopsis Inc., in "Design Compiler® User Guide Version D-2010.03-SP2," June, 2010.

One of the techniques used in digital design is digital pipeline, described, for example, by Ramamoorty and Li, in "Pipeline Architecture," Journal ACM Computing Surveys (CSUR), Surveys Homepage archive, Volume 9, Issue 1, March, 1977, Pages 61-102.

SUMMARY OF THE INVENTION

An embodiment of the present invention that is described herein provides a method for designing a logic circuit, including providing an initial design of the logic circuit, including (i) at least first and second logic stages, and (ii) a sequential component, which is inserted between the first and second logic stages and comprises a flip-flop or a latch. Timing delays of multiple paths in the initial design, including at least one path in which the sequential component is bypassed, are estimated based on the timing delays. A decision is made whether or not the paths in which the sequential component is bypassed meet a timing constraint set for the logic circuit. A final design of the logic circuit, in which the sequential component is either bypassed or not bypassed depending on the decision, is generated.

In an embodiment, generating the final design of the logic circuit, in which the sequential component is bypassed, includes connecting the output of the sequential component to the input of the sequential component, and removing the sequential component from the final design. In another embodiment, the sequential component includes a multiplexor that is configured to select between an output of the flip-flop or latch and an input of the flip-flop or latch. In yet another embodiment making the decision includes deciding that the sequential component is to be bypassed, in response to verifying that the timing delays of all the paths in which the sequential component is bypassed meet the timing constraint.

In some embodiments, making the decision includes deciding that the sequential component is not to be bypassed, in response to verifying that the timing delays of one or more paths in which the sequential component is bypassed violate the timing constraint.

There is also provided, in accordance with an embodiment of the present invention, a system including a memory and a processor. The processor is configured to retrieve from the memory an initial design of the logic circuit, including (i) at least first and second pipeline stages, and (ii) a sequential component, which is inserted between the first and second pipeline stages and includes a flip-flop or a latch, to estimate timing delays of multiple paths in the initial design, including at least one path in which the sequential component is bypassed; based on the timing delays, to make or to obtain from a user a decision whether or not the sequential component is to bypassed, and to generate a final design of the logic circuit, in which the sequential component is either bypassed or not bypassed, depending on the decision.

In some embodiments, the processor is configured to generate the final design of the logic circuit, in which the sequential component is bypassed, by connecting the output of the sequential component to the input of the sequential component; and removing the sequential component from the final design. In other embodiments the sequential component includes a multiplexor that is configured to select between an output of the flip-flop or latch and an input of the flip-flop or latch. In yet other embodiments the processor is configured to decide that the sequential component is to be bypassed, in response to verifying that the timing delays of all the paths in which the sequential component is bypassed meet the timing constraint.

In an embodiment, the processor is configured to decide that the sequential component is not to be bypassed, in response to verifying that the timing delays of one or more paths in which the sequential component is bypassed violate the timing constraint.

The present invention will be more fully understood from the following detailed description of the embodiments thereof, taken together with the drawings in which:

BRIEF DESCRIPTION OF THE DRAWINGS

FIG. 2 is a block diagram that schematically illustrates a two-pipeline-stages logic circuit design, in accordance with an embodiment of the present invention;

FIG. 3 is a block diagram that schematically illustrates an n-pipeline-stages logic circuit design, in accordance with an embodiment of the present invention;

DETAILED DESCRIPTION OF EMBODIMENTS

Overview

Figure 1:
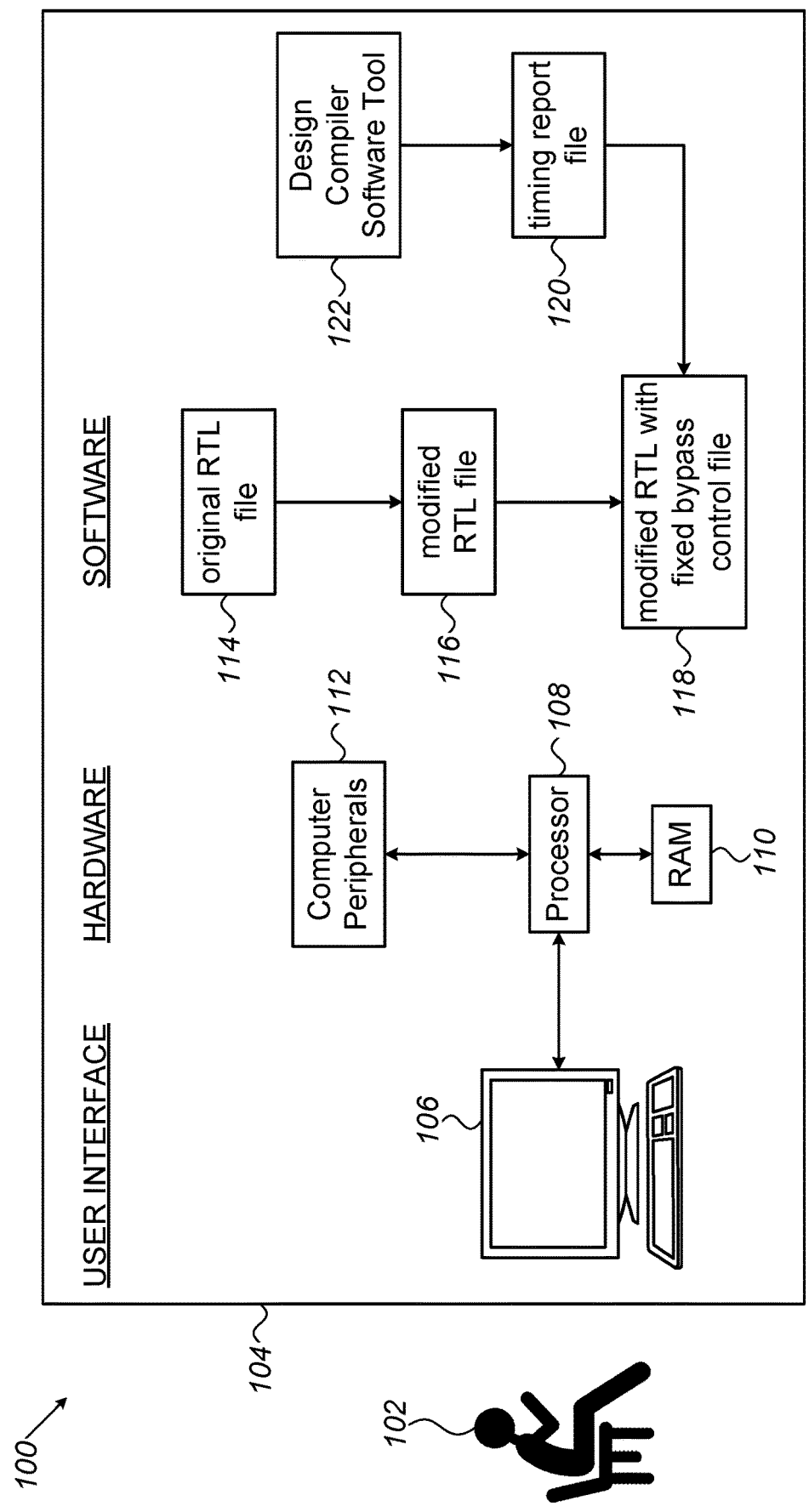
FIG. 1 is a block diagram that schematically illustrates a system for timing-adaptive, configurable design of a logic architecture.

Digital design techniques typically comprise two main steps—RTL design, in which a pure logical model of the design is built, and the conversion of the RTL to physical devices—mainly CMOS transistors.

RTL design is the modeling of the design by combinatorial logic functions implemented by logic gates, and by sequential components, which store data asserted on their inputs upon the occurrence of a predefined event. In most of the embodiments described herein, the sequential component comprises a D-Flip-Flop, which stores the logic state asserted on its input when there is a transition (high to low, low to high and, sometimes, any transition) on its Clock input. The disclosed techniques, however, are not limited to D Flip-Flops. In the present context, the term "sequential component" will mean any type of logic memory elements, including (but not limited to) D-FF, SR-FF, T-FF and latches and RAM.

In embodiments of the present invention, the clock input is typically common to large sections of the design. Faster clock frequencies imply faster operation of the logic circuit. Therefore, the clock frequency, or its reciprocal—the clock period, are of paramount importance.

Delays are associated with the various elements of the RTL design. Propagation delays are defined as the time from a change in a gate input to a corresponding change in the gate output. Setup delays are defined as the time during which an input to a sequential component must be valid prior to the edge of the clock in which the sequential component stores the logic state at that input. Other delay types are used, but omitted herein for clarity, as they are not relevant to embodiments of the present invention described hereinbelow.

According to embodiments of the present invention, a set of logic paths is defined for any logic design. Each path comprises interconnected logic elements, starting from a "Source Flip-Flop" or from an external input to the logic design, and ending at a "Destination Flip-Flop," or at an external output from the logic design. Signal propagation delay trough any logic path, starting with an edge of the clock input of the Source Flip-Flop, should be such that the input of the Destination Flip-Flop will be valid at least Setup-time prior to the clock edge in which it is stored thereof.

This timing constraint often limits the maximum clock frequency of the logic design. The delay increases when the number of logic gates between Source and Destination Flip-Flops increases, and hence complex functions, with more logic gates, may imply slower clock rates.

One way to avoid slower clock rates is to implement complex logic functions using logic stages. The functions are divided to stages, wherein each stage comprises combinatorial logic that implements a subset of the logic function, and a set of inter-stage Flip-Flops. Subsequent calculations of the functions are executed in an overlapped manner. Division of the logic design to stages will be referred to hereinafter as "Pipelining."

For example, if the sum $S_i$ of four numbers Ai, Bi, Ci, Di is to be continuously calculated, a pipelined design may comprise a first stage with two adders:

$$X_i = A_i + B_i,\ Y_i = C_i + D_i;$$

a set of Flip-Flops to store $X_i$ and $Y_i$; and a second stage with one adder:

$$S_i = X_i + Y_i$$

At any time step t the first stage will calculate and store:

$$X_t = A_t + B_t,\ Y_t = C_t + D_t;$$

and the second stage will calculate:

$$S_{t-1} = X_{t-1} = Y_{t-1}.$$

Latency of pipelined logic design is defined as the delay, typically in clock cycles, from the time the inputs of the logic function are valid, to the time that the output is valid. In the example described above, latency is two clock cycles. Long latency does not affect the system throughput, as an output is generated in every clock cycle. However, long latency has some significant drawbacks. As more flip-flops are needed, the area and the power consumption of the circuit increase. Also, in practical circuits, it is sometimes necessary to change the input according to the output—in those cases it is usually necessary to wait until data propagation through the pipeline is completed, which decreases the overall performance.

The stage of converting the RTL design to physical devices is generally referred to as RTL to gates, or synthesis. It is typically done by complex software tools. An example of such a tool is Synopsys Design Compiler (DC), cited above.

DC covers several aspects of the design. In addition to the conversion of RTL to gates, it estimates the power consumption of the design, adds DFT (Design for Testability) tools, allows the use of a variety of pre-designed library elements, estimates areas and propagation delays, and more. One of the outputs that DC generates is a list of estimated delays of the various paths of the design.

Digital designs typically have design goals, which comprise logic functionality, timing goals, power goals area goals, and sometimes a combination of the goals above.

When an RTL design is first submitted to the DC tool (or to a similar RTL-to-Gates tool), some of the design goals may not be met. In those cases, it is possible in principle for the logic designer to modify the RTL code, and attempts to run DC again. For example, if the design fails to meet the timing requirements, the logic designer may add pipeline stages in the RTL, which decrease the number of logic stages per clock cycle, at the cost of increased latency. In other cases, the design goals are met, but the logic designer may wish to optimize it, for example, to reduce the area.

Thus, in the above-described design cycle, there can be several iterations, wherein in each iteration the RTL is modified, DC is run, its output is studied, and a new design is generated, to improve the results.

According to embodiments of the present invention, the RTL design of some logic functions comprises the design of a multi-stage pipeline, wherein the number of pipeline stages is large enough so that the delay of each stage will be safely below the delay required to meet a frequency design goal, and wherein some or all of the flip-flops of the pipeline are modified flip-flops, which comprise a flip-flop bypass path.

According to embodiments, the modified flip-flops comprise a flip flop, configured to store input data, and a bypass circuit (for example—multiplexor), configured to facilitate bypassing of the flip flop when a Bypass input is set.

A pipelined design modified as explained above comprises separate designs of the same logic function with varying number of pipeline stages. For example, a two-stage pipeline is a two-stage implementation when bypass is disabled, and one stage implementation when bypass is enabled. Thus, the same RTL code implements two different designs.

According to some embodiments of the present invention, the design process comprises:

a) a first run of a synthesis tool to generate timing reports of all paths, including paths that bypass the flip-flops;

b) an analysis, which can be manual or automatic, of the synthesis timing report, to find out if paths that bypass some or all the flip-flops meet the frequency goal;

c) modifying the RTL by connecting the bypass inputs of each of the modified flip-flops to an "enable-bypass" logic-value if all paths that bypass the flip-flop meet the frequency goal, and to a "disable-bypass" logic value otherwise; and d) a second run of the synthesis tool with the modified design.

Unmodified General-use flip-flops will be referred to hereinafter as GFF, whereas flip-flops modified by the addition of a bypass multiplexor will be referred to hereinafter as MFF.

Thus, according to embodiments of the present invention, a designer may be able to design a single RTL source, comprising a plurality of implementations of the same logic functionality with varying number of pipeline stages. The designer may then run a timing analysis of the RTL source, and select the desired pipeline length according to the results.

SYSTEM DESCRIPTION

FIG. 1 is a block diagram that schematically illustrates a system 100 facilitating the design process of a timing-adaptive, configurable logic architecture, According to embodiments of the present invention. A designer 102 communicates with a computer system 104 through a terminal 106.

According to an embodiment, the hardware of computer system 104 comprises a processor 108, a memory device 110 (typically a RAM) and peripherals 112. The software of computer system 104 comprises an original RTL file 114, a modified RTL file 116, a modified RTL with fixed bypass inputs file 118, a timing report file 120, a Design Compiler (DC) software tool 122, comprising the DC executable image and other DC utility files. Some or all of software components 114, 116, 118, 120, 122, may be stored, temporarily or permanently, in RAM 110.

According to an embodiment, designer 102 first modifies the original RTL file 114 by replacing flip flops with modified flip-flops, wherein a modified flip flop comprises a flip flop that can be bypassed by a Bypass control input and storing the resultant RTL in modified RTL file 116. According to an embodiment, the designer next executes DC program 122, which generates timing analysis reports of the modified RTL code, and stores them in the timing reports file 120.

According to embodiments of the present invention, the designer next examines the timing reports and modifies the modified RTL file 116 by fixing the input levels of the bypass controls of the modified flip flops according to the timing report. The resultant file 118 is the original RTL file, optimized according to the present invention.

The configurations of system 100 and its components, as shown in FIG. 1, are example configurations that are shown purely for the sake of conceptual clarity. Any other suitable system configurations can be used in alternative embodiments. The different elements of system 100 may be implemented using suitable software, using hardware, or using a combination of hardware and software elements. In some embodiments, processor 108 comprises a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

FIG. 2 is a block diagram that schematically describes a two-stage pipelined implementation 200 of a logic function, in accordance with embodiments of the present invention. According to an embodiment, the number of stages of Pipeline 200 may be reduced to 1, as will be explained below.

The pipeline comprises a first GFF stage 212, a first combinatorial logic stage 214, an MFF stage 216, a second combinatorial logic stage 218, and a second GFF stage 220. GFF 212 comprises a D flip-flop (D-FF) 230, configured to store its input on the rising edge of a clock input (not shown).

According to an embodiment of the present invention, MFF 216 comprises a D-FF 232, configured to store its input on the rising edge of the clock input, and a multiplexor 234, configured to assert on its output: a) the output of D-FF 232 if a bypass input of the multiplexor is at logic-0; or b) the input to MFF 216 if the bypass input is at logic-1.

According to embodiments of the present invention, one or more of the inputs to combinatorial logic 214 are connected to the output of GFF 212; other inputs of combinatorial logic 214 may be connected to outputs of other logic elements (not shown). The output of combinatorial logic 214 is connected to the input of MFF 216. Other outputs may be connected to the inputs of other logic elements (not shown).

In a similar manner, one of the inputs of combinatorial logic 218 may be connected to the output of MFF 216, and one of its outputs may be connected to the input of GFF 220.

In accordance to an embodiment, the combinatorial logic units 214, 218 of pipelined logic 210 implement a complex logic function. The pipelined logic comprises one or two pipeline stages—if the bypass input is at logic-0, the data path includes D-FF 232, and the number of stages is 2. If the bypass input is at logic 1, D-FF 232 is bypassed, and the number of pipeline stages is 1.

FIG. 3 is a block diagram that schematically describes an n-stage pipeline implementation 300 of a logic function, in accordance with embodiments of the present invention. According to an embodiment, the number of stages of Pipeline 300 may be reduced to a number less than n, as will be explained hereinbelow.

In an embodiment, the pipeline comprises a first GFF 302, n pipeline stages 304, a combinatorial logic 306 and a second GFF 308. Each Pipeline Stage 304 comprises a combinatorial logic 310 and an MFF 216 (FIG. 2), wherein the input of pipeline stage 304 is connected to one or more of the inputs of combinatorial logic 310; one or more of the outputs of combinatorial logic 310 is connected to the input of MFF 216, and the output of MFF 216 is connected to output of pipeline-stage 304.

According to embodiments of the present invention, the output of the first GFF 302 is connected to the input of the first pipeline stage 304; all pipeline stages 304 are configured so that the output of one stage is connected to the input of the next stage; the output of the nth pipeline stage 304 is connected to an input of combinatorial logic 306, and an output of combinatorial logic 306 is connected to the input of the second GFF 308.

Figure 4:
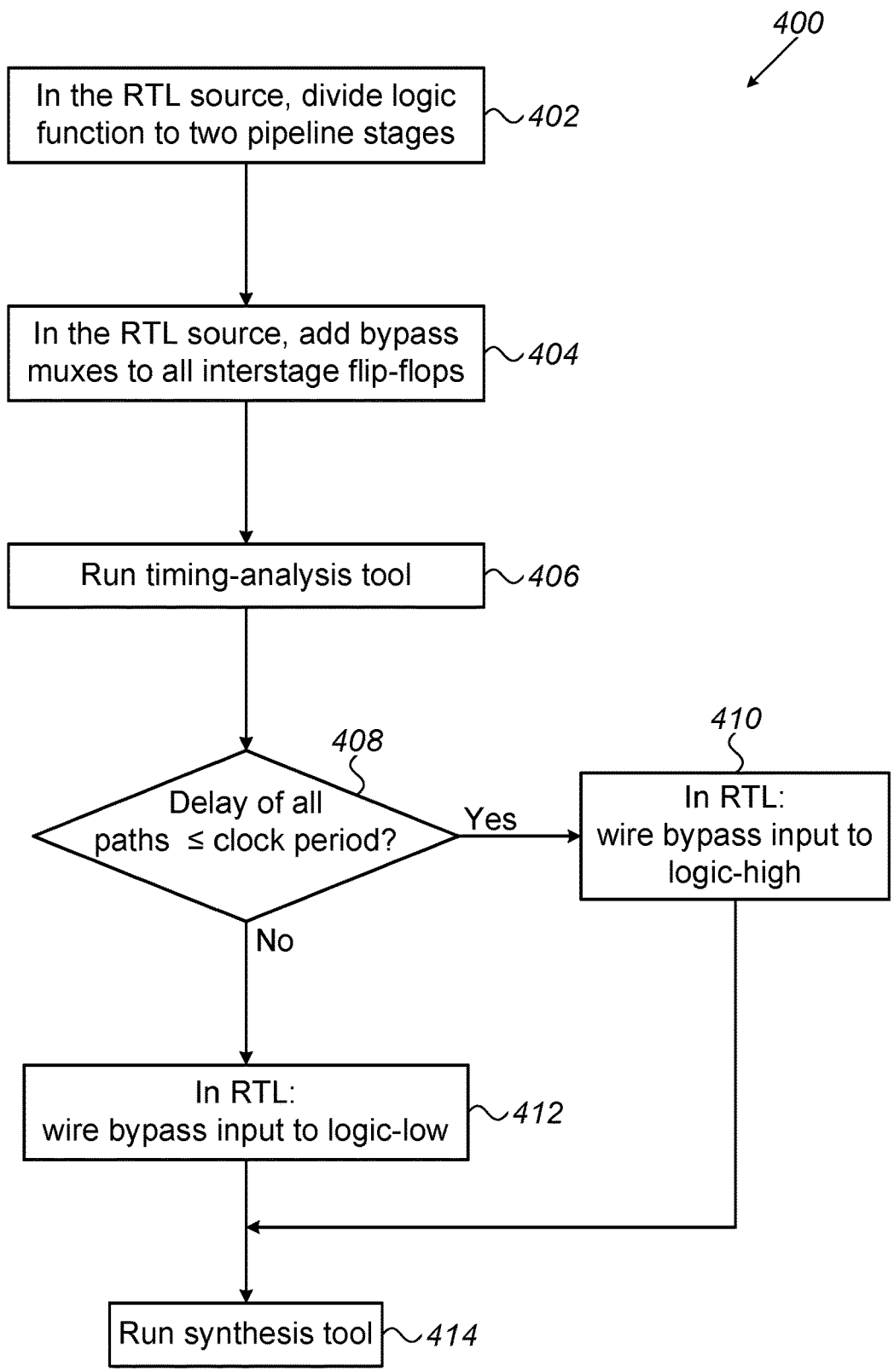
FIG. 4 is a flow chart that schematically illustrates a method for designing a two-pipeline-stages logic circuit, in accordance with an embodiment of the present invention.

FIG. 4 is a flow chart 400 that schematically illustrates a method for designing a two-pipeline-stages logic circuit, in accordance to embodiments of the present invention. The flow starts at a Creating RTL Pipeline stage 402, wherein Designer 102 (FIG. 1) describes the logic function in an RTL code, using two-stage pipeline. Next, at an adding-bypass stage step 404, the designer modifies the RTL design, by adding a bypass path to the inter-stage flip-flops, with a Bypass control input, wherein the inter-stage flip-flop will be bypassed if the Bypass control is set.

The designer next submits the modified logic design of step 404, to a run-timing-analysis step 406, wherein a timing analysis tool checks all timing paths in the modified logic design and generates an estimated timing report. According to embodiments of the present invention, the timing analysis tool may comprise Design Compiler 120 of FIG. 1.

Next, at a Checking Paths-Delay stage 408, the designer checks if the accumulated delay of each of the paths of the modified logic that bypasses the inter-stage flip-flop, is less than or equal to the clock period.

If, at step 408, the accumulated delay of each of the paths of the modified logic that bypasses the inter-stage flip-flop is less than or equal to the clock period, the designer will next execute enabling-bypass step 410, wherein the designer will connect the Bypass input to constant logic-1, bypassing the inter-stage flip-flops.

If, at step 408, the accumulated delay of any of the paths of the modified logic that bypasses the inter-stage flip-flop, is more than the clock period, the designer will next execute disabling-bypass step 412, wherein the designer will connect the Bypass input to constant logic-0, disabling all paths that bypass the inter-stage flip-flops.

Following steps 410 or 412, the designer executes running synthesis step 414, wherein the designer may submit the modified design with the bypass input connected to constant logic 1 or constant logic 0 to a synthesis tool.

Alternatively to connecting the bypass input to constant logic 0, the designer may remove the bypass multiplexor from the RTL design; and/or, alternatively to connecting the bypass input to constant logic 1, the designer may remove the both the bypass multiplexor and the flip-flop from the RTL.

Figure 5:
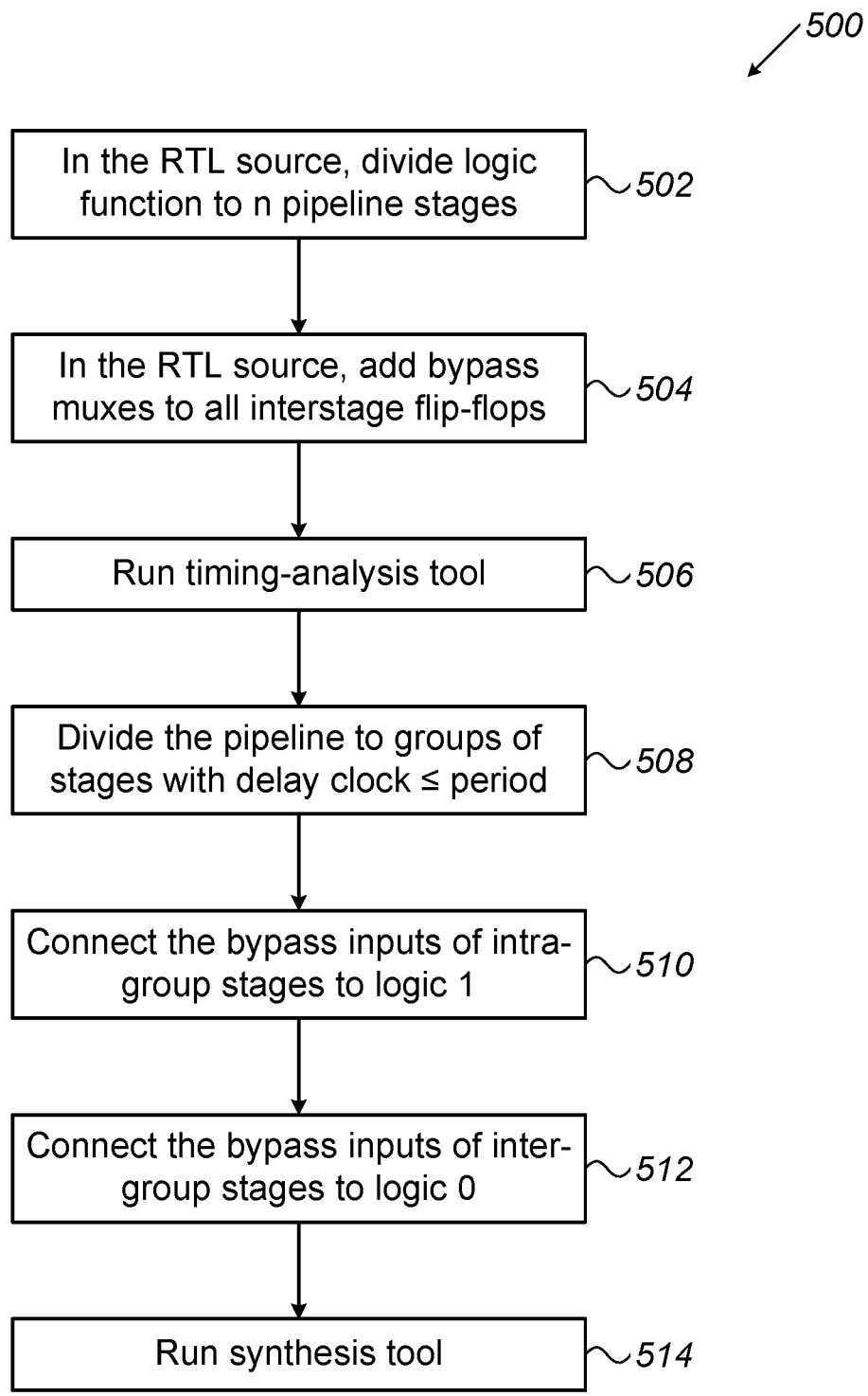
FIG. 5 is a flow chart that schematically illustrates a method for designing an n-pipeline-stages logic circuit, in accordance with an embodiment of the present invention.

FIG. 5 is a flow chart 500 that schematically illustrates a method for designing an n-pipeline-stages logic circuit, in accordance to embodiments of the present invention. The flow starts in Creating RTL Pipeline stage 502, wherein the designer describes the logic function in an RTL code, using n-stage pipeline. Next, in adding-bypass stage step 504, the designer modifies the RTL design, by adding a bypass path to all inter-stage flip-flops, with a Bypass control input for each stage, wherein the inter-stage flip-flops will be bypassed if the Bypass control is set.

The designer may next submit the modified logic design of step 504, to run-timing-analysis step 506, wherein a timing analysis tool checks all timing paths in the modified logic design and generates an estimated timing report. According to embodiments of the present invention, the timing analysis tool may be the Design Compiler.

Next, in Dividing-Pipeline-to-Groups step 508, the designer creates a list of groups of pipeline stages, wherein each group comprises interconnected pipeline stages, and wherein the accumulated delay of all paths within each group is less than equal to the clock period.

Next, in enabling intra-group-bypass step 510, the designer connects all the bypass inputs of the stages internal to the groups (defined in step 508) to logic-1, in effect, merging the stages of each group to a single stage.

Next, in disabling inter-group bypass step 512, the designer connects the bypass inputs of all inter-group pipeline stages to logic 0; in effect, implementing actual pipeline stages.

Lastly, in running synthesis step 514, the designer may submit the modified design with the bypass inputs connected to constant logic 1 and/or constant logic 0 to a synthesis tool.

The process flows of FIGS. 4 and 5 are example flow, which are depicted for the sake of conceptual clarity. In alternative embodiments, any other suitable flow can be used to carry out the disclosed design techniques. For example, the process of selecting groups of pipeline stages described above can be done by a software tool instead of manually by designer 102. Moreover, connecting the bypass inputs to logic one or logic 0, in accordance to steps 508 and 510, can be done by the same or by a different software tool. Further—the methods described herein, or parts thereof, may be embedded in other design tools, including but not limited to a synthesizer tool, all in accordance with the present invention.

The descriptions herein pertain to single clock designs, where all flip-flops change at the same clock edge. However, the disclosures herein include, mutatis mutandis, multiple clock-domain designs, designs with multiple-phase clocks, designs where some of the paths may propagate in several clock cycles ("multicycle paths"), designs where some of the paths may be ignored ("False-Paths"), and similar.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for designing a logic circuit, the method comprising:
   providing an initial design of the logic circuit, comprising (i) at least first and second logic stages, and (ii) a sequential component, which is inserted between the first and second logic stages and comprises a flip-flop or a latch;
   estimating timing delays of multiple paths in the initial design, including at least one path in which the sequential component is bypassed;
   based on the timing delays, making a decision whether or not the paths in which the sequential component is bypassed meet a timing constraint set for the logic circuit; and
   generating a final design of the logic circuit, in which the sequential component is either bypassed or not bypassed, depending on the decision.

2. The method according to claim 1,
   wherein generating the final design of the logic circuit, in which the sequential component is bypassed, comprises connecting an output of the sequential component to an input of the sequential component, and removing the sequential component from the final design.

3. The method according to claim 1, wherein the sequential component comprises a multiplexor that is configured to select between an output of the flip-flop or latch and an input of the flip-flop or latch.

4. The method according to claim 1, wherein making the decision comprises deciding that the sequential component is to be bypassed, in response to verifying that the timing delays of all the paths in which the sequential component is bypassed meet the timing constraint.

5. The method according to claim 1, wherein making the decision comprises deciding that the sequential component is not to be bypassed, in response to verifying that the timing delays of one or more paths in which the sequential component is bypassed violate the timing constraint.

6. A system, comprising:
   a memory; and
   a processor, which is configured to:
      retrieve from the memory an initial design of the logic circuit, comprising (i) at least first and second pipeline stages, and (ii) a sequential component, which is inserted between the first and second pipeline stages and comprises a flip-flop or a latch;

estimate timing delays of multiple paths in the initial design, including at least one path in which the sequential component is bypassed;

based on the timing delays, make or obtain from a user a decision whether or not the sequential component is to bypassed; and generate a final design of the logic circuit, in which the sequential component is either bypassed, or not bypassed, depending on the decision.

7. The system according to claim 6, wherein the processor is configured to generate the final design of the logic circuit, in which the sequential component is bypassed, by connecting an output of the sequential component to an input of the sequential component, and removing the sequential component from the final design.

8. The system according to claim 6, wherein the sequential component comprises a multiplexor that is configured to select between an output of the flip-flop or latch and an input of the flip-flop or latch.

9. The system according to claim 6, wherein the processor is configured to decide that the sequential component is to be bypassed, in response to verifying that the timing delays of all the paths in which the sequential component is bypassed meet the timing constraint.

10. The system according to claim 6, wherein the processor is configured to decide that the sequential component is not to be bypassed, in response to verifying that the timing delays of one or more paths in which the sequential component is bypassed violate the timing constraint.

* * * * *